United States Patent
McMillen et al.

(10) Patent No.: US 11,753,345 B2
(45) Date of Patent: Sep. 12, 2023

(54) SYSTEMS AND METHODS FOR MAKING CERAMIC POWDERS AND CERAMIC PRODUCTS

(71) Applicant: ALCOA USA CORP., Pittsburgh, PA (US)

(72) Inventors: James C. McMillen, Pittsburgh, PA (US); Lance M. Sworts, New Kensington, PA (US); Benjamin D. Mosser, Pittsburgh, PA (US)

(73) Assignee: ALCOA USA CORP., Pittsburgh, PA (US)

( * ) Notice: Subject to any disclaimer, the term of this patent is extended or adjusted under 35 U.S.C. 154(b) by 0 days.

(21) Appl. No.: 16/228,295

(22) Filed: Dec. 20, 2018

(65) Prior Publication Data
US 2019/0127282 A1 May 2, 2019

Related U.S. Application Data

(63) Continuation of application No. PCT/US2017/039048, filed on Jun. 23, 2017.
(Continued)

(51) Int. Cl.
| | | |
|---|---|---|
| *C04B 35/58* | (2006.01) | |
| *C04B 35/626* | (2006.01) | |
| *C01B 35/04* | (2006.01) | |

(52) U.S. Cl.
CPC ........ *C04B 35/58071* (2013.01); *C01B 35/04* (2013.01); *C04B 35/58* (2013.01);
(Continued)

(58) Field of Classification Search
CPC ......... C04B 35/04; C04B 35/52; C04B 35/58; C04B 35/58071; C04B 2235/3241;
(Continued)

(56) References Cited

U.S. PATENT DOCUMENTS

| 4,266,977 A | 5/1981 | Steiger |
|---|---|---|
| 4,275,026 A | 6/1981 | Hazel et al. |

(Continued)

FOREIGN PATENT DOCUMENTS

| DE | 0177092 A2 * | 4/1986 |
|---|---|---|
| EP | 0177092 | 4/1986 |

(Continued)

OTHER PUBLICATIONS

Machine translation of Fujiwara et al. (JPH06270921A), publication date Oct. 4, 1994.*

(Continued)

*Primary Examiner* — Jun Li
(74) *Attorney, Agent, or Firm* — Greenberg Traurig, LLP

(57) ABSTRACT

Systems and methods for making ceramic powders are provided. The method for forming a ceramic powder includes: preparing a precursor mixture, wherein the preparing comprises adding at least one additive to a plurality of reagents, wherein the at least one additive includes at least one of: an oxide, a salt, a pure metal, or an alloy of elements ranging from atomic numbers 21 through 30, 39 through 51, and 57 through 77 and combinations thereof; and carbothermically reacting the precursor mixture to form a ceramic powder, wherein, due to the preparing step, the precursor mixture comprises a sufficient amount of the at least one additive to form the ceramic powder, wherein the ceramic powder comprises: (a) a morphology selected from the group consisting of irregular, equiaxed, plate-like, and combinations thereof; and (b) a particle size distribution selected from the group consisting of fine, intermediate, coarse, and combinations thereof.

14 Claims, 10 Drawing Sheets

Related U.S. Application Data

(60) Provisional application No. 62/353,880, filed on Jun. 23, 2016.

(52) U.S. Cl.
CPC .... C04B 35/626 (2013.01); *C04B 2235/3241* (2013.01); *C04B 2235/3258* (2013.01); *C04B 2235/3272* (2013.01); *C04B 2235/3275* (2013.01); *C04B 2235/3279* (2013.01); *C04B 2235/405* (2013.01); *C04B 2235/42* (2013.01); *C04B 2235/425* (2013.01); *C04B 2235/52* (2013.01); *C04B 2235/5292* (2013.01); *C04B 2235/5436* (2013.01); *C04B 2235/6586* (2013.01)

(58) Field of Classification Search
CPC .... C04B 2235/3258; C04B 2235/3272; C04B 2235/3275; C04B 2235/3279
See application file for complete search history.

(56) References Cited

U.S. PATENT DOCUMENTS

| | | | | |
|---|---|---|---|---|
| 4,282,195 | A * | 8/1981 | Hoekje | B01J 4/001 204/164 |
| 4,673,550 | A * | 6/1987 | Dallaire | C04B 35/651 419/45 |
| 4,921,531 | A * | 5/1990 | Nagle | B22F 3/23 423/297 |
| 4,968,348 | A * | 11/1990 | Abkowitz | C22C 32/0073 419/12 |
| 5,100,845 | A | 3/1992 | Montgomery | |
| 5,110,565 | A * | 5/1992 | Weimer | C01B 32/907 422/198 |
| 5,160,716 | A * | 11/1992 | Logan | C01B 35/04 423/297 |
| 5,194,234 | A | 3/1993 | Weimer et al. | |
| 8,142,749 | B2 * | 3/2012 | Landwehr | C04B 35/6261 423/297 |
| 8,211,278 | B2 | 7/2012 | Weirauch, Jr. et al. | |
| 8,216,536 | B2 * | 7/2012 | McMillen | C01B 35/04 423/297 |
| 9,732,422 | B2 * | 8/2017 | She | C22C 21/00 |
| 9,802,829 | B2 * | 10/2017 | McMillen | C01B 35/04 |
| 2008/0029886 | A1 | 2/2008 | Cotte et al. | |
| 2010/0176339 | A1 * | 7/2010 | Chandran | C04B 41/0036 252/182.33 |
| 2011/0104033 | A1 | 5/2011 | McMillen | |
| 2012/0244057 | A1 | 9/2012 | McMillen | |
| 2013/0330256 | A1 | 12/2013 | Weaver et al. | |
| 2015/0218055 | A1 | 8/2015 | McMillen et al. | |
| 2016/0052795 | A1 | 2/2016 | Weaver et al. | |
| 2017/0036919 | A1 | 2/2017 | McMillen | |
| 2018/0009717 | A1 | 1/2018 | Mosser et al. | |

FOREIGN PATENT DOCUMENTS

| | | |
|---|---|---|
| EP | 0376179 A2 | 7/1990 |
| JP | S42-24669 | 11/1967 |
| JP | 06279021 A * | 10/1994 |
| SE | 506982 C2 | 3/1998 |

OTHER PUBLICATIONS

International Search Report and Written Opinion, dated Sep. 22, 2017, from corresponding International Patent App. No. PCT/US2017/039048.
Blokhina, I. A., et al. "Carbothermal Synthesis of $TiB_2$ Powders of Micron Size", *Inorganic Materials* 52(6):550-557 (2016).
Degrave, I. E., et al., "Composite Powders of the $TiC$-$TiB_2$ System", *Glass and Ceramics* 57(11-12):396-398 (2002).
Kang, S.H., et al., "Synthesis of nano-titanium diboride powders by carbothermal reduction" *Journal of the European Ceramic Society* 27:715-718 (2007).
Saito, T., et al., "Synthesis of ultrafine titanium diboride particles by rapid carbothermal reduction in a particulate transport reactor" *Journal of Materials Science* 32:3933-3938 (1997).
Subramanian, C., et al., "Synthesis and consolidation of titanium diboride", *International Journal of Refractory Metals & Hard Materials* 25:345 (2007).
Welham, N. J., "Mechanical enhancement of the carbothermic formation of $TiB_2$", *Metallurgical and Materials Transactions A* 31A:283-289 (Jan. 2000).
Yu, J., et al., "Carbothermal reduction synthesis of $TiB_2$ ultrafine powders", *Ceramics International* 42(3):3916-3920 (Feb. 15, 2016).

* cited by examiner

SYSTEMS AND METHODS FOR MAKING CERAMIC POWDERS AND CERAMIC PRODUCTS

CROSS-REFERENCE TO RELATED APPLICATIONS

This application is a continuation of International Patent Application No. PCT/US2017/039048, filed Jun. 23, 2017, which claims benefit of U.S. provisional application No. 62/353,880, filed Jun. 23, 2016, each of which is herein incorporated by reference in its entirety.

FIELD OF THE INVENTION

Broadly, the invention relates to systems and methods of making ceramic materials. More specifically, the present disclosure relates to carbothermically synthesizing various metal boride ceramic powders to tailor particular characteristics and/or properties of the powder product (i.e. particle shape, particle size distribution).

BACKGROUND

Through carbothermic synthesis, it is possible to make various metal boride ceramic powders. The powder can be used as a final product or processed into final ceramic products for a wide variety of applications.

SUMMARY OF THE INVENTION

In some embodiments, a method is provided, comprising: adding a sufficient amount of additives to a plurality of reagents to form a precursor mixture so that when the precursor mixture is carbothermically reacted the precursor mixture forms a ceramic powder, wherein the additive includes at least one of: an oxide, a salt, a pure metal, or an alloy of elements ranging from atomic numbers 21 through 30, 39 through 51, and 57 through 77 and combinations thereof; and carbothermically reacting the precursor mixture to form a ceramic powder, wherein the ceramic powder comprises: a) a morphology selected from the group consisting of irregular, equiaxed, plate-like, and combinations thereof, and b) a particle size distribution selected from the group consisting of fine, intermediate, coarse, and combinations thereof.

In some embodiments, the sufficient amount of the additive is less than 0.75 wt. % based on a total weight of the ceramic powder.

In some embodiments, the method further comprises: removing an undesired byproduct of the carbothermic reaction via exposing the precursor mixture to a process gas flow during the carbothermic reacting step.

In some embodiments, exposing the precursor mixture further comprises: directing the process gas flow through the precursor mixture during the carbothermic reacting step.

In some embodiments, the process gas is selected from the group consisting of: a noble gas, hydrogen, and combinations thereof.

In some embodiments, the ceramic powder comprises a metal boride ceramic.

In some embodiments, the precursor mixture comprises: an amount of an oxide comprising a titanium source, an amount of a carbon source; and an amount of a boron source.

In some embodiments, the oxide is 20 weight percent (wt. %) to 50 wt. % based a total weight of the precursor mixture.

In some embodiments, the carbon source is present in the precursor mixture in an amount of 10 wt. % to 35 wt. % based on a total weight of the precursor mixture.

In some embodiments, the carbon source comprises graphite.

In some embodiments, the boron source is present in the precursor mixture in an amount of 30 wt. % to 70 wt. % based on a total weight of the precursor mixture.

In some embodiments, the ceramic powder comprises titanium diboride.

In some embodiments, the sufficient amount of additive of 0.7 wt. %, comprising 0.2 wt % Fe and 0.5 wt. % Cr, provides a TiB2 morphology of fine particle size distribution of equiaxed grains.

In some embodiments, the sufficient amount of additive of 0.4 wt. %, comprising 0.2 wt. % Fe and 0.2 wt. % S, provides a TiB2 morphology of a coarse particle size distribution of plate-like grains.

In some embodiments, the sufficient amount of additive of 0.26 wt. %, comprising Fe, Ni, Co, and W, provides a TiB2 morphology of a fine particle size distribution of irregular grains.

In some embodiments, the sufficient amount of additive of 4 wt. % S provides a TiB2 morphology of a coarse particle size distribution of equiaxed grains.

In some embodiments, a method is provided, comprising: adding a sufficient amount of additives to a plurality of reagents to form a precursor mixture so that when the precursor mixture is carbothermically reacted the precursor mixture forms a ceramic powder, wherein the plurality of reagents comprise a first amount of a reducing agent; a second amount of a reactant, and wherein the additive includes at least one of: an oxide, a salt, a pure metal, or an alloy of elements ranging from atomic numbers 21 through 30, 39 through 51, and 57 through 77 and combinations thereof; and carbothermically reacting the precursor mixture to form a ceramic powder, wherein the ceramic powder comprises: a) a morphology selected from the group consisting of irregular, equiaxed, plate-like, and combinations thereof, and b) a particle size distribution selected from the group consisting of fine, intermediate, coarse, and combinations thereof.

In some embodiments, the sufficient amount of the additive is less than 0.75 wt. % based on a total weight of the ceramic powder.

In some embodiments, the method further comprises: removing an undesired byproduct of the carbothermic reaction via exposing the precursor mixture to a process gas flow during the carbothermic reacting step.

In some embodiments, exposing the precursor mixture further comprises: directing the process gas flow through the precursor mixture during the carbothermic reacting step.

BRIEF DESCRIPTION OF THE DRAWINGS DESCRIPTION

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

FIG. 1 is a scanning electron microscope ("SEM") image taken at 2500× magnification with an Aspex Instruments Model PSEM II in backscatter electron mode.

FIG. 2 is an SEM image taken at 2500× magnification with an Aspex Instruments Model PSEM II in backscatter electron mode.

FIG. 3 is an SEM image taken at 2500× magnification with an Aspex Instruments Model PSEM II in backscatter electron mode.

Figure 3A:
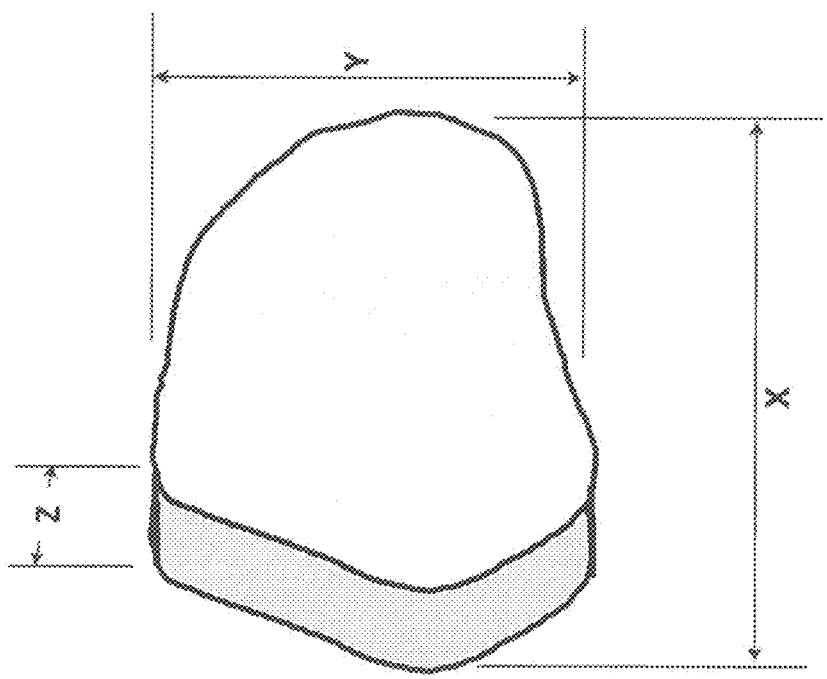

FIG. 3A is a schematic of an embodiment of the present disclosure, depicting the quantification of a ceramic powder's characteristic shape factor, or the shape factors associated with a particle (e.g. ceramic powder product) mean a ratio of multiple dimensions of the particle. As shown in FIG. 3A, the shape factors associated with the particle shown include a ratio of the x, y and z dimensions of the particle.

Figure 4:
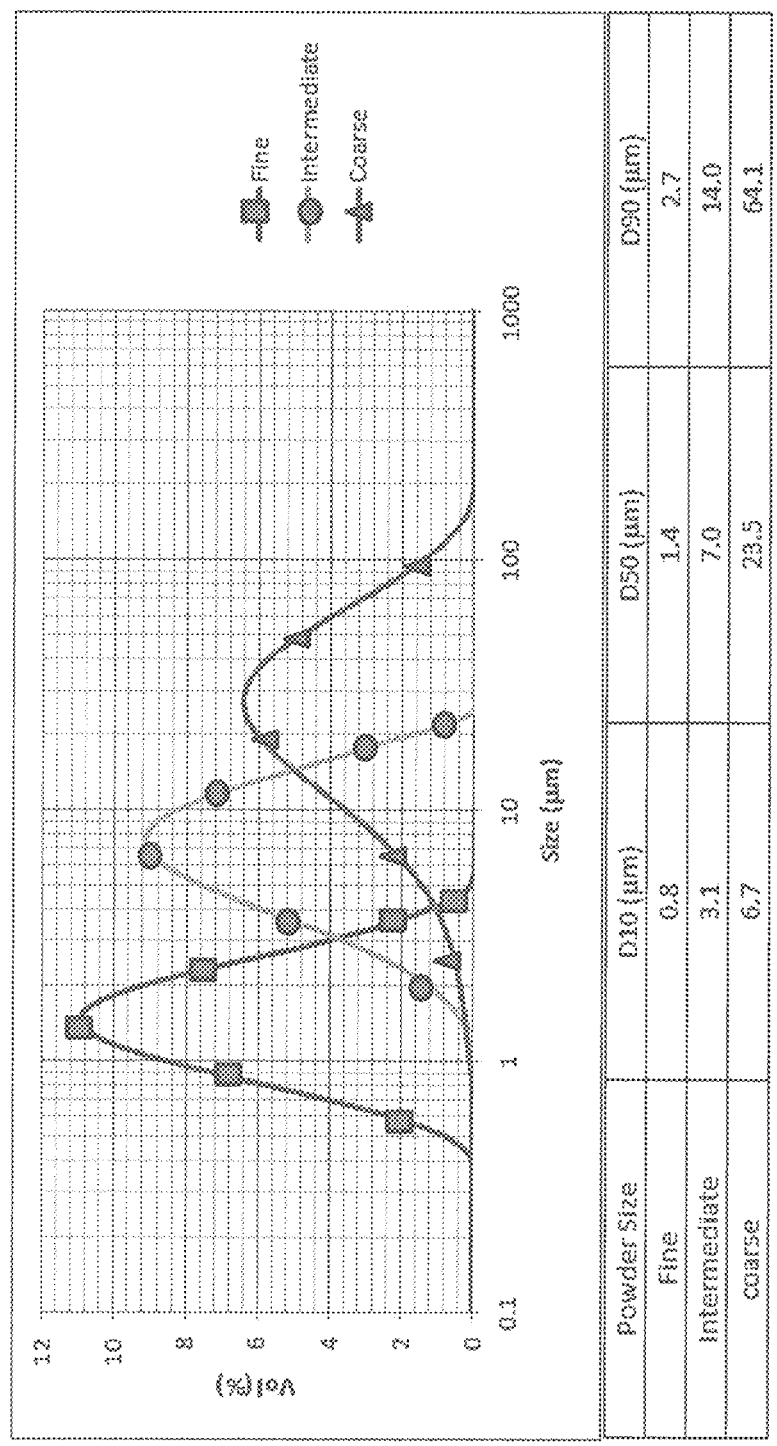

FIG. 4 depicts a graph depicting volume percent vs. size (micrometers) for three different particle size distributions, in accordance with the present disclosure: fine, intermediate, and coarse particle sizes. Referring to the chart and accompanying table, each particle size distribution includes data points plotted for D10, D50, and D90 values, such that each particle size distribution is plotted in curves, with contrasting curve location, height, and width of the corresponding curves for different particle size distributions readily observable in FIG. 4, in accordance with the instant disclosure.

Figures 5, 6, 7:
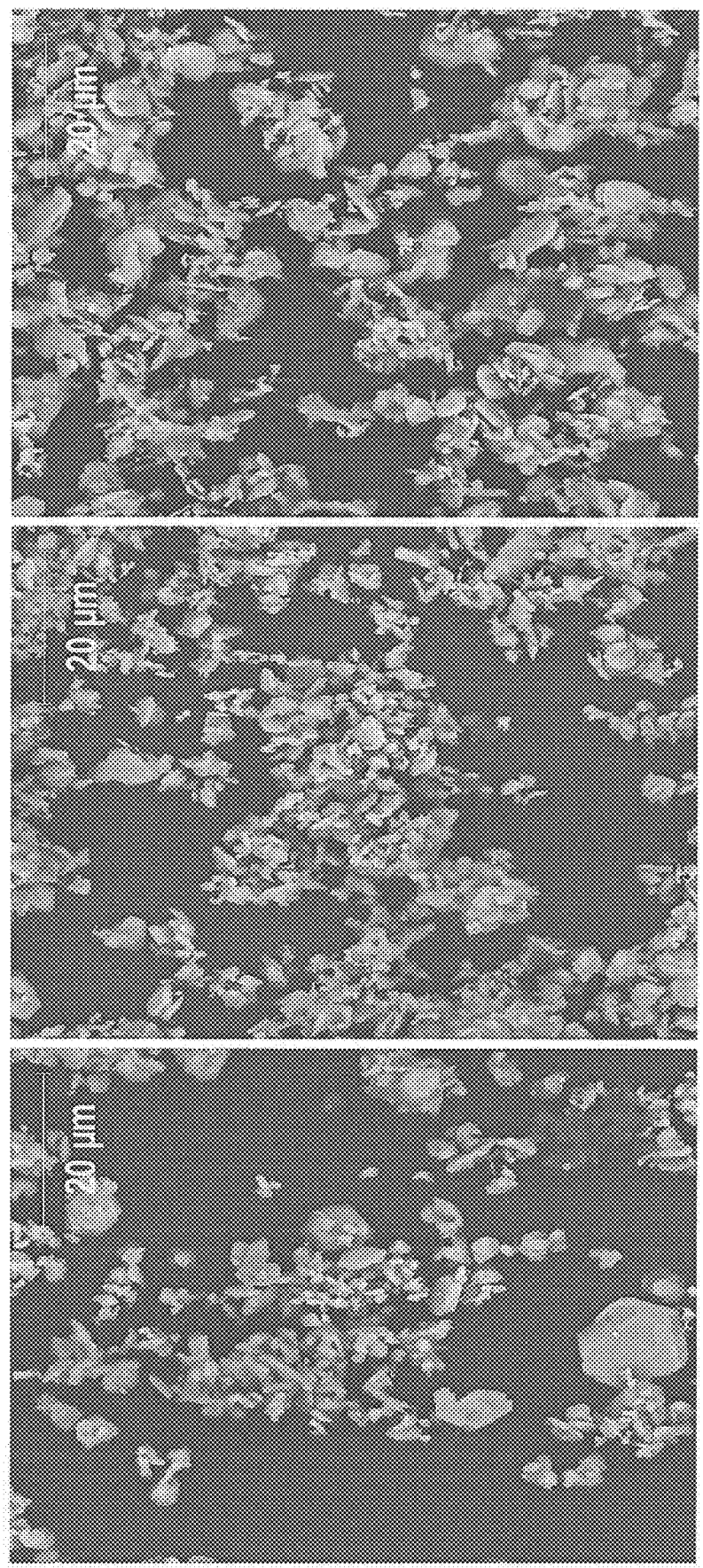

FIG. 5 depicts an SEM image of an embodiment of ceramic powder in accordance with the present disclosure: $TiB_2$ ceramic powder having the following morphology: a particle size distribution containing predominately fine irregular grains with the inclusion of a low percentage of coarse-plate like grains. FIG. 5 corresponds to the ceramic powder material obtained from TiB2 Type 10 run summarized in Table 2.

FIG. 6 depicts an SEM image of an embodiment of ceramic powder in accordance with the present disclosure: TiB2 ceramic powder having the following morphology: a particle size distribution of fine irregular grains. FIG. 6 corresponds to the ceramic powder material obtained from $TiB_2$ Type 7 run summarized in Table 2.

FIG. 7 depicts an SEM image of an embodiment of ceramic powder in accordance with the present disclosure: TiB2 ceramic powder having the following morphology: a particle size distribution of fine and intermediate sized plate-like grains. FIG. 7 corresponds to the ceramic powder material obtained from $TiB_2$ Type 13 run summarized in Table 2.

Figures 8, 9, 10:
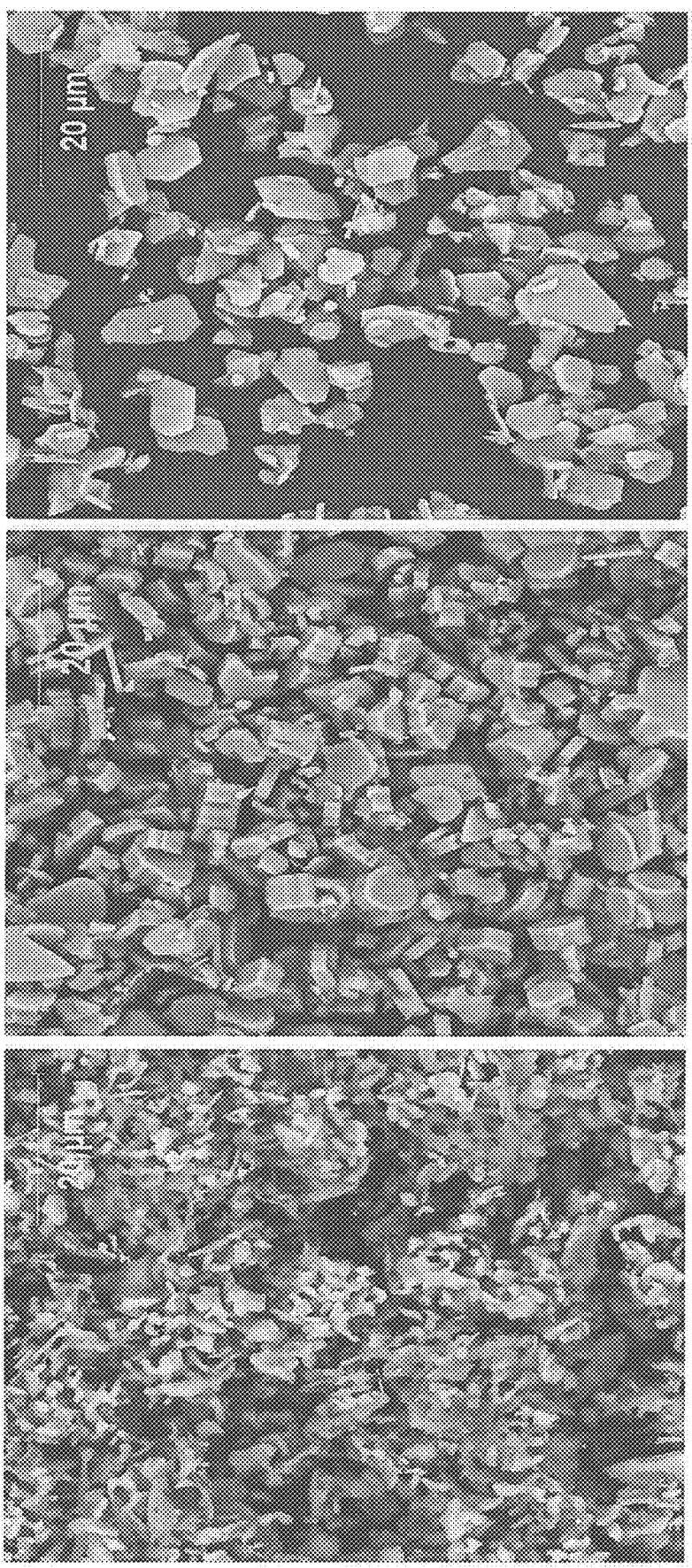

FIG. 8 depicts an SEM image of an embodiment of ceramic powder in accordance with the present disclosure: $TiB_2$ ceramic powder having the following morphology: a particle size distribution containing predominately fine irregular grains with the inclusion of a low percentage of intermediate plate-like grains. FIG. 8 corresponds to the ceramic powder material obtained from $TiB_2$ Type 5 run summarized in Table 2.

FIG. 9 depicts an SEM image of an embodiment of ceramic powder in accordance with the present disclosure: $TiB_2$ ceramic powder having the following morphology: a particle size distribution of coarse equiaxed grains. FIG. 9 corresponds to the ceramic powder material obtained from $TiB_2$ Type 24 run summarized in Table 2.

FIG. 10 depicts an SEM image of an embodiment of ceramic powder in accordance with the present disclosure: $TiB_2$ ceramic powder having the following morphology: a particle size distribution of coarse plate-like grains. FIG. 10 corresponds to the ceramic powder material obtained from $TiB_2$ Type 28 run summarized in Table 2.

Figures 11, 12, 13:
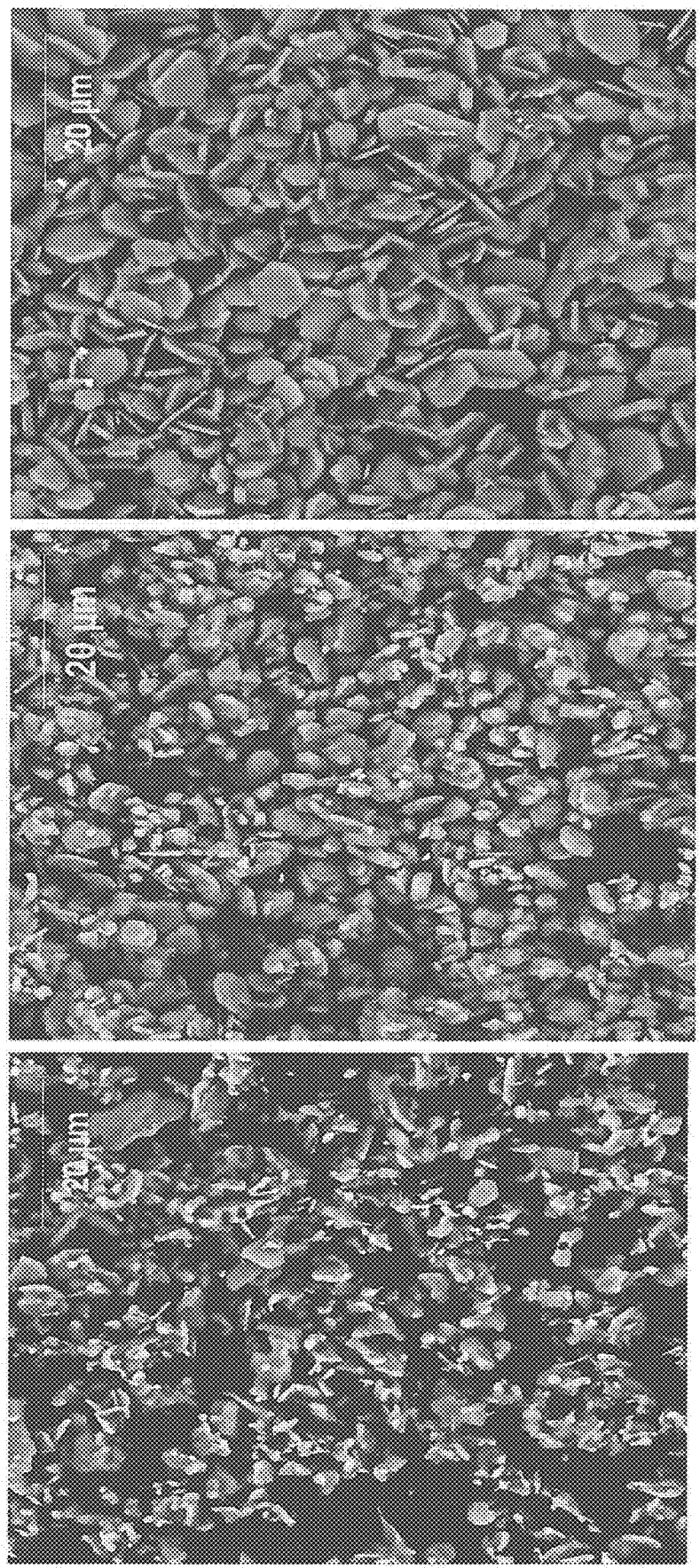

FIG. 11 depicts an SEM image of an embodiment of ceramic powder in accordance with the present disclosure: $TiB_2$ ceramic powder having the following morphology: a particle size distribution containing predominately fine irregular grains with the inclusion of a low percentage of coarse-plate like grains. FIG. 11 corresponds to the ceramic powder material obtained from $TiB_2$ Type 16 run summarized in Table 2.

FIG. 12 depicts an SEM image of an embodiment of ceramic powder in accordance with the present disclosure: $TiB_2$ ceramic powder having the following morphology: a particle size distribution of intermediate sized equiaxed grains and intermediate sized plate-like grains. FIG. 12 corresponds to the ceramic powder material obtained from $TiB_2$ Type 22 run summarized in Table 2.

FIG. 13 depicts an SEM image of an embodiment of ceramic powder in accordance with the present disclosure: $TiB_2$ ceramic powder having the following morphology: a particle size distribution of coarse plate-like grains. FIG. 13 corresponds to the ceramic powder material obtained from $TiB_2$ Type 29 run summarized in Table 2.

Figure 14:
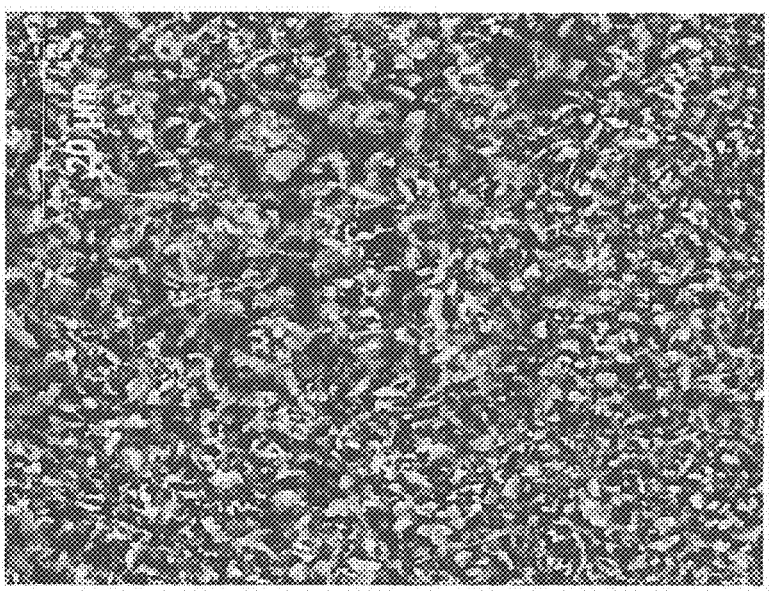

FIG. 14 depicts an SEM image of an embodiment of ceramic powder in accordance with the present disclosure: TiB2 ceramic powder having the following morphology: a particle size distribution of predominately fine irregular grains and a small concentration of fine equiaxed and coarse plate-like grains. FIG. 14 corresponds to the ceramic powder material obtained from TiB2 Type 16 run summarized in Table 2.

Figure 15:
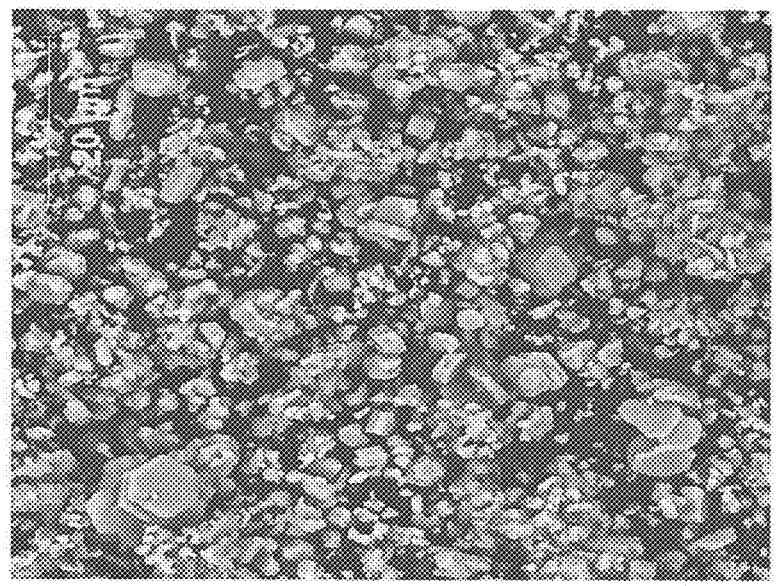

FIG. 15 depicts an SEM image of an embodiment of ceramic powder in accordance with the present disclosure: TiB2 ceramic powder having the following morphology: a particle size distribution of fine equiaxed grains and intermediate sized plate-like grains. FIG. 15 corresponds to the ceramic powder material obtained from TiB2 Type 20 run summarized in Table 2.

Figure 16:
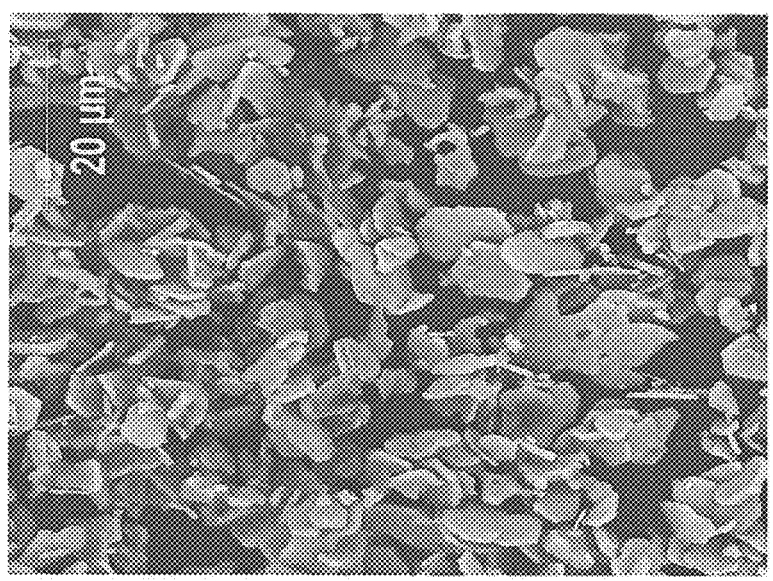

FIG. 16 depicts an SEM image of an embodiment of ceramic powder in accordance with the present disclosure: TiB2 ceramic powder having the following morphology: a particle size distribution of coarse plate-like grains. FIG. 16 corresponds to the ceramic powder material obtained from TiB2 Type 29 run summarized in Table 2.

Figure 17:
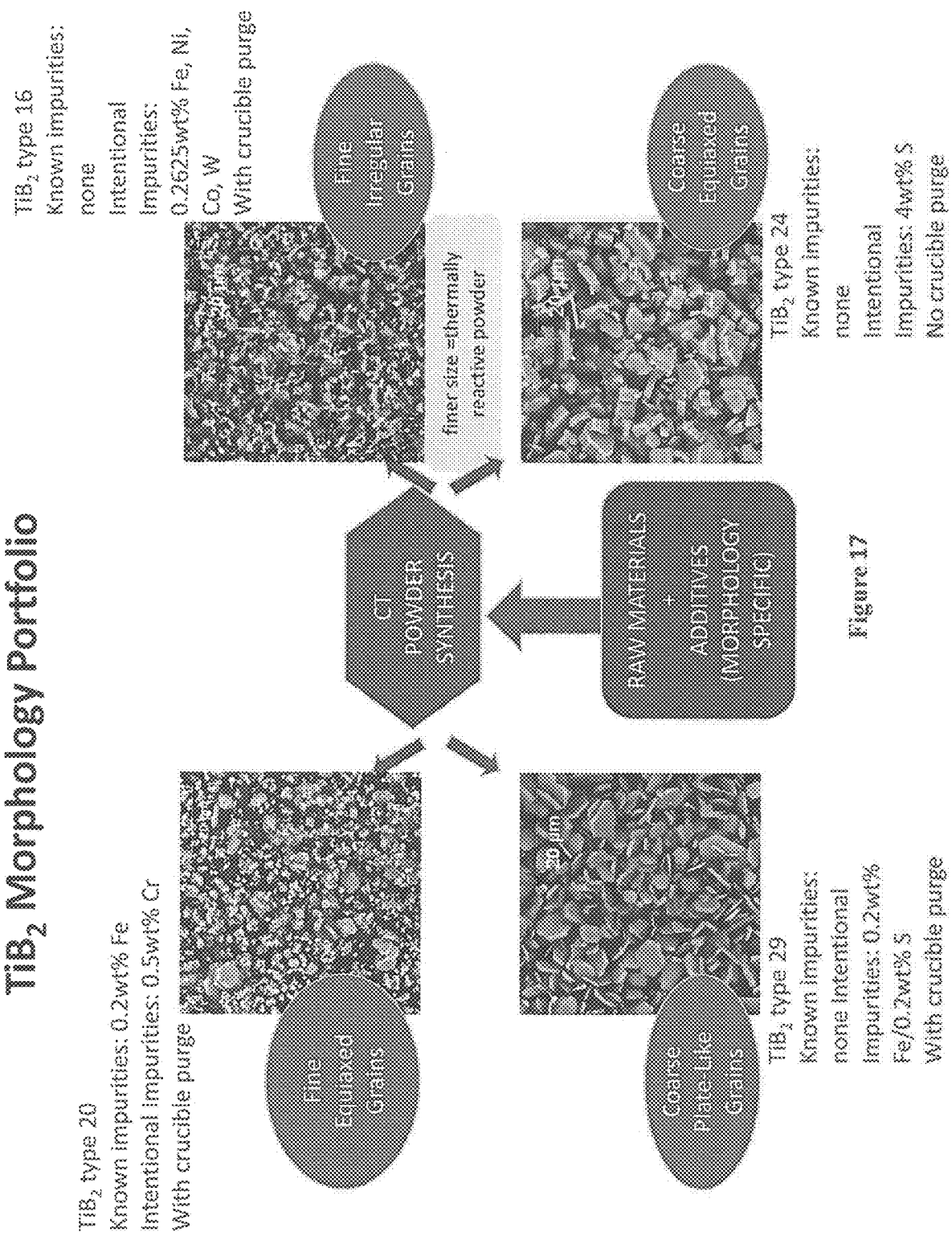

FIG. 17 provides a schematic outline of various production pathways to make TiB2 ceramic powder having different morphologies, in accordance with various embodiments of the instant disclosure, based on the data obtained in the bench top furnace and summarized in Table 2.

Figure 18:
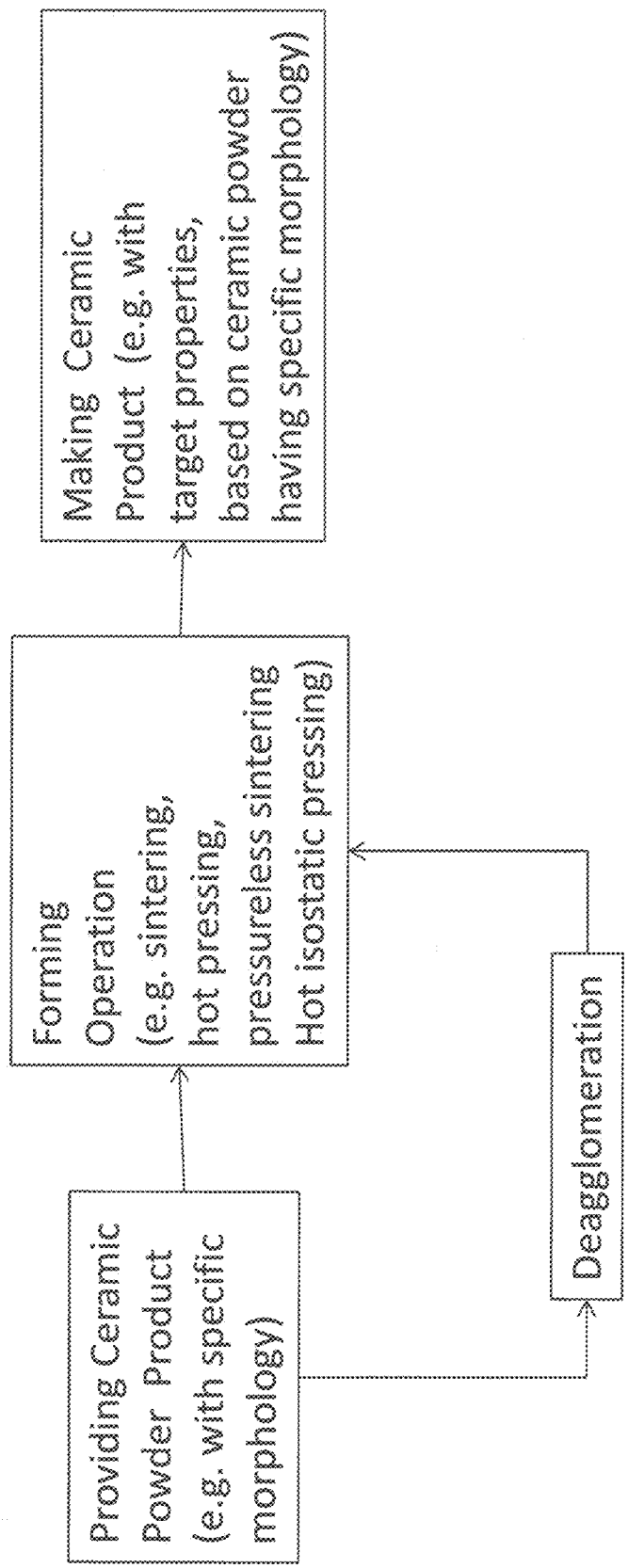

FIG. 18 depicts a schematic of an embodiment of a method in accordance with the instant disclosure, including: providing a ceramic powder product having a specific morphology, for the utility of creating a ceramic part from the ceramic powder in accordance with ceramic production pathways (e.g., hot pressing, pressureless sintering, and/or hot isostatic pressing). In some embodiments, the as-reacted ceramic powder is still solid and/or semi-solid shape based on the configuration of the precursor mixture, such that a deagglomeration step is completed on the ceramic powder product prior to downstream processing. In some embodiments, forming including forming a green form (e.g. which is then further processed to form a final ceramic product).

Figure 19:
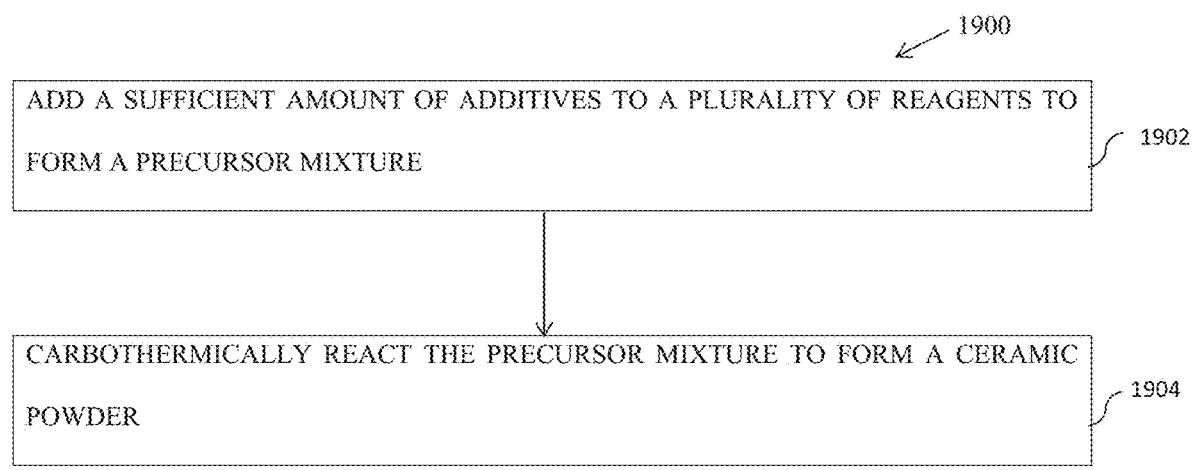

FIG. 19 depicts a flowchart of a method for forming ceramic powders in accordance with some embodiments of the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figures 1, 2, 3:
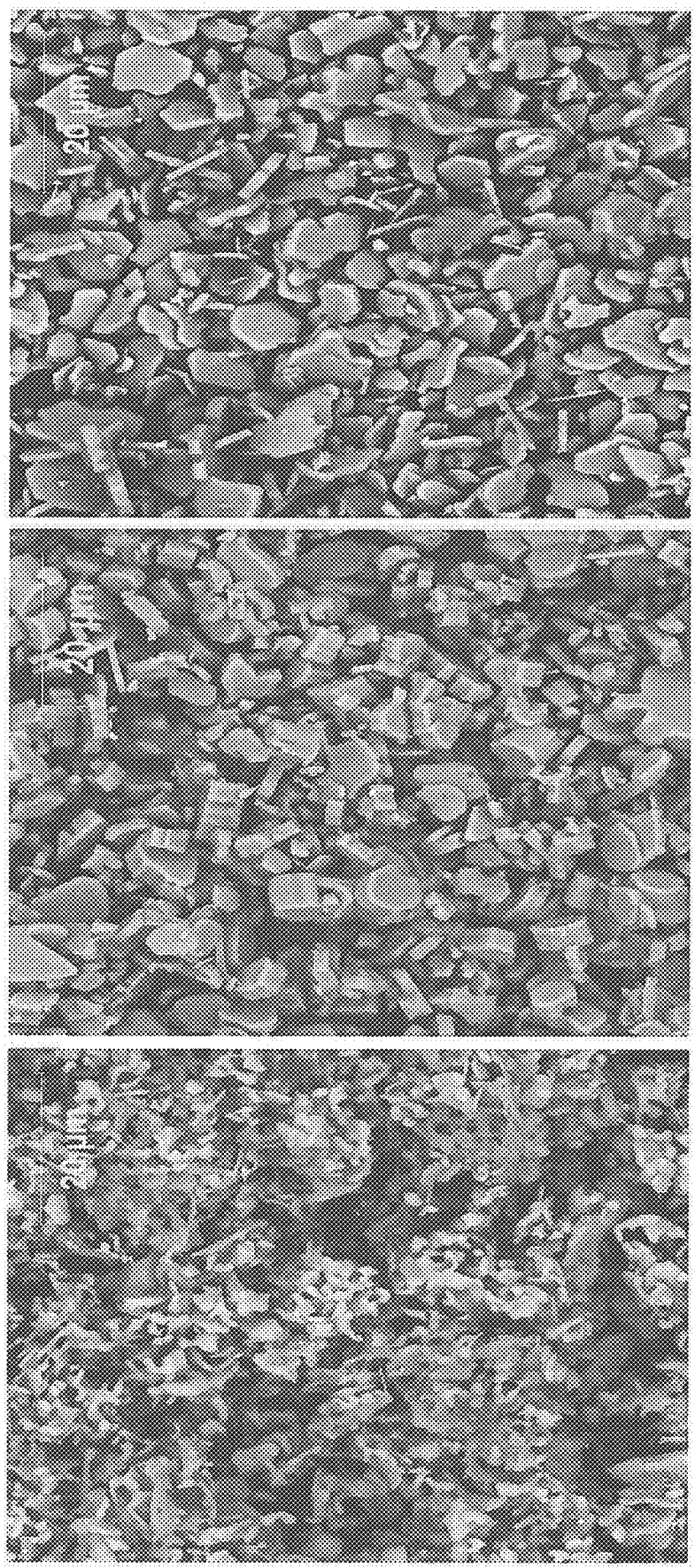
FIG. 1 depicts an embodiment of ceramic powder having an irregular powder morphology in accordance with an embodiment of the present disclosure.
FIG. 2 depicts an embodiment of ceramic powder having an equiaxed powder morphology in accordance with an embodiment of the present disclosure.
FIG. 3 depicts an embodiment of ceramic powder having a plate-like powder morphology in accordance with the present disclosure.

As used herein, the term "irregular" powder morphology means the powder grains are angular and have no specific shape. A scanning electron microscope ("SEM") image of an "irregular" powder morphology taken at 2500× magnification with an Aspex Instruments Model PSEM II in backscatter electron mode is shown in FIG. 1.

As used herein, the term "equiaxed" powder morphology means the powder grains have a shape with a thickness equal to or near equal to width and length. In some embodiments, the powder grains of an equiaxed powder morphology have an aspect ratio of about 1:1:1. An SEM image of an "equiaxed" powder morphology taken at 2500× magnification with an Aspex Instruments Model PSEM II in backscatter electron mode is shown in FIG. 2.

As used herein, the term "plate-like" powder morphology means the powder grains have a shape with one dimension much smaller than other dimensions of the powder grains. An SEM image of a "plate-like" powder morphology taken at 2500× magnification with an Aspex Instruments Model PSEM II in backscatter electron mode is shown in FIG. 3.

As used herein, the "shape factors" associated with a particle mean a ratio of multiple dimensions of the particle. For example, the shape factors associated with the particle shown in FIG. 3A include a ratio of the x, y and z dimensions of the particle. The shape factors associated with the SEM images shown in FIGS. 1, 2, and 3 are detailed below:

TABLE 1

| FIG. | Typical Dimension Ratio | | |
|---|---|---|---|
| | X | Y | Z |
| 1 | 1 | 1 | 1 |
| | 10 | 1 | 1 |
| 2 | 5 | 5 | 3 |
| 3 | 10 | 10 | 1 |

As shown in Table 1, a powder may have particles with a range of shape factors.

As used herein, a "fine" particle size distribution means the median (D50) size of the powder grains is less than 3 microns. A non-limiting example of a "fine" particle size distribution is shown in FIG. 4.

As used herein, an "intermediate" particle size distribution means the median (D50) size of the powder grains is 3 to 10 microns. A non-limiting example of an "intermediate" particle size distribution is shown in FIG. 4.

As used herein, a "coarse" particle size distribution means the median (D50) size of the powder grains is greater than 10 microns. A non-limiting example of a "coarse" particle size distribution is shown in FIG. 4.

As used herein, the term "carbothermic reaction" means a reaction that includes the reduction of substances using carbon as the reducing agent at elevated temperatures that typically ranging from about 500 to about 2,500 degrees Celsius.

FIG. 19 depicts a flow chart of a method 1900 for forming ceramic powders. In some embodiments, the method 1900 begins at 1902 by adding a sufficient amount of additives to a plurality of reagents to form a precursor mixture.

In some embodiments, the reagents comprise a first amount of titanium dioxide; a second amount of a carbon source; a third amount of a boron source (e.g. boric acid ($H_3BO_3$), boron oxide ($B_2O_3$)); and a sufficient amount of an additive (e.g. type and amount to tailor the resulting ceramic powder product to a particular morphology (shape factor and particle size)). In some embodiments, the additive includes at least one of an oxide, a salt, a pure metal or an alloy of elements ranging from atomic numbers 21 through 30, 39 through 51, and 57 through 77, and combinations thereof. In some embodiments, the additive includes iron (Fe), nickel (Ni), cobalt (Co), tungsten (W), chromium (Cr), manganese (Mn), molybdenum (Mo), palladium (Pd), sulfur (S), or combinations thereof. In some embodiments, the additive includes Fe. In some embodiments, the additive includes Ni. In some embodiments, the additive includes Co. In some embodiments, the additive includes W. In some embodiments, the additive includes Cr. In some embodiments, the additive includes Mn. In some embodiments, the additive includes Mo. In some embodiments, the additive includes Pd. In some embodiments, the additive includes S.

In some embodiments, the additive includes Fe and Ni. In some embodiments, the additive includes Fe, Ni and Co. In some embodiments, the additive includes Fe, Ni, Co and W. In some embodiments, the additive includes Fe, Ni, Co, W, and S. In some embodiments, the additive includes Fe, Co, W. In some embodiments, the additive includes S and Co. In some embodiments, the additive includes S and Fe.

In some embodiments, the first amount of the titanium dioxide is 20 weight percent (wt. %) to 50 wt. % based a total weight of the precursor mixture. In some embodiments, the first amount of the titanium dioxide is 25 wt. % to 50 wt. % based a total weight of the precursor mixture. In some embodiments, the first amount of the titanium dioxide is 30 wt. % to 50 wt. % based a total weight of the precursor mixture. In some embodiments, the first amount of the titanium dioxide is 35 wt. % to 50 wt. % based a total weight of the precursor mixture. In some embodiments, the first amount of the titanium dioxide is 40 wt. % to 50 wt. % based a total weight of the precursor mixture. In some embodiments, the first amount of the titanium dioxide is 45 wt. % to 50 wt. % based a total weight of the precursor mixture.

In some embodiments, the first amount of the titanium dioxide is 20 wt. % to 45 wt. % based a total weight of the precursor mixture. In some embodiments, the first amount of the titanium dioxide is 20 wt. % to 40 wt. % based a total weight of the precursor mixture. In some embodiments, the first amount of the titanium dioxide is 20 wt. % to 35 wt. % based a total weight of the precursor mixture. In some embodiments, the first amount of the titanium dioxide is 20 wt. % to 30 wt. % based a total weight of the precursor mixture. In some embodiments, the first amount of the titanium dioxide is 20 wt. % to 25 wt. % based a total weight of the precursor mixture.

In some embodiments, the first amount of the titanium dioxide is 25 wt. % to 45 wt. % based a total weight of the precursor mixture. In some embodiments, the first amount of the titanium dioxide is 30 wt. % to 40 wt. % based a total weight of the precursor mixture.

In some embodiments, the carbon source is graphite and/or a carbonaceous gas such as methane, ethane, propane or the like. In some embodiments, the carbon source is graphite. In some embodiments, the carbon source is a carbonaceous gas.

In some embodiments, the second amount of the carbon source is 10 wt. % to 35 wt. % based on a total weight of the precursor mixture. In some embodiments, the second amount of the carbon source is 15 wt. % to 35 wt. % based on a total weight of the precursor mixture. In some embodiments, the second amount of the carbon source is 20 wt. % to 35 wt. % based on a total weight of the precursor mixture. In some embodiments, the second amount of the carbon source is 25 wt. % to 35 wt. % based on a total weight of the precursor mixture. In some embodiments, the second amount of the carbon source is 30 wt. % to 35 wt. % based on a total weight of the precursor mixture. In some embodiments, the amount of carbonaceous gasses is sufficient to satisfy the carbon requirements of the synthesis reaction.

In some embodiments, the second amount of the carbon source is 10 wt. % to 30 wt. % based on a total weight of the precursor mixture. In some embodiments, the second amount of the carbon source is 10 wt. % to 25 wt. % based on a total weight of the precursor mixture. In some embodiments, the second amount of the carbon source is 10 wt. % to 20 wt. % based on a total weight of the precursor mixture. In some embodiments, the second amount of the carbon source is 10 wt. % to 15 wt. % based on a total weight of the precursor mixture.

In some embodiments, the second amount of the carbon source is 15 wt. % to 30 wt. % based on a total weight of the precursor mixture. In some embodiments, the second amount of the carbon source is 15 wt. % to 25 wt. % based on a total weight of the precursor mixture. In some embodiments, the second amount of the carbon source is 20 wt. % to 25 wt. % based on a total weight of the precursor mixture.

In some embodiments, the third amount of the boron source is 30 wt. % to 70 wt. % based on a total weight of the precursor mixture. In some embodiments, the third amount of the boron source is 30 wt. % to 65 wt. % based on a total weight of the precursor mixture. In some embodiments, the third amount of the boron source is 30 wt. % to 60 wt. % based on a total weight of the precursor mixture. In some embodiments, the third amount of the boron source is 30 wt. % to 55 wt. % based on a total weight of the precursor mixture. In some embodiments, the third amount of the boron source is 30 wt. % to 50 wt. % based on a total weight of the precursor mixture. In some embodiments, the third amount of the boron source is 30 wt. % to 45 wt. % based on a total weight of the precursor mixture. In some embodiments, the third amount of the boron source is 30 wt. % to 40 wt. % based on a total weight of the precursor mixture. In some embodiments, the third amount of the boron source is 30 wt. % to 35 wt. % based on a total weight of the precursor mixture.

In some embodiments, the third amount of the boron source is 35 wt. % to 70 wt. % based on a total weight of the precursor mixture. In some embodiments, the third amount of the boron source is 40 wt. % to 70 wt. % based on a total weight of the precursor mixture. In some embodiments, the third amount of the boron source is 45 wt. % to 70 wt. % based on a total weight of the precursor mixture. In some embodiments, the third amount of the boron source is 50 wt. % to 70 wt. % based on a total weight of the precursor mixture. In some embodiments, the third amount of the boron source is 55 wt. % to 70 wt. % based on a total weight of the precursor mixture. In some embodiments, the third amount of the boron source is 60 wt. % to 70 wt. % based on a total weight of the precursor mixture. In some embodiments, the third amount of the boron source is 65 wt. % to 70 wt. % based on a total weight of the precursor mixture.

In some embodiments, the third amount of the boron source is 35 wt. % to 65 wt. % based on a total weight of the precursor mixture. In some embodiments, the third amount of the boron source is 40 wt. % to 60 wt. % based on a total weight of the precursor mixture. In some embodiments, the third amount of the boron source is 45 wt. % to 55 wt. % based on a total weight of the precursor mixture.

Next at 1904, the method 1900 further comprises carbothermically reacting the precursor mixture to form a ceramic powder having a morphology and a particle size distribution. In some embodiments, particle morphology may control properties of the resultant ceramic powder including, but not limited to, abrasiveness, tribology, thermal reactivity, chemical reactivity, chemical adsorption, mass transport, packing, crystallographic orientation, electrical conductivity, and dispensability. Non-limiting examples of carbothermic reactions forming TiB2 ceramic powders are shown in the following equations, also providing the reaction temperature and Gibb's Free Energy (delta H) for each reaction:

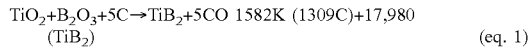
$TiO_2+B_2O_3+5C \rightarrow TiB_2+5CO$ 1582K (1309C)+17,980 (TiB$_2$) (eq. 1)

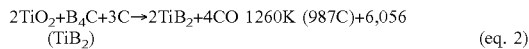
$2TiO_2+B_4C+3C \rightarrow 2TiB_2+4CO$ 1260K (987C)+6,056 (TiB$_2$) (eq. 2)

In some embodiments, the ceramic powder is titanium diboride. In some embodiments, the sufficient amount of the additive results in the titanium diboride powder having the morphology selected from the group consisting of irregular, equiaxed, plate-like, and combinations thereof and the particle size distribution is selected from the group consisting of fine, intermediate, coarse, and combinations thereof.

In some embodiments, the method further includes exposing the precursor mixture to a process gas. In some embodiments, the process gas is an inert gas. In some embodiments, the process gas is selected from the group consisting of any noble gas, hydrogen, and combinations thereof. In some embodiments, adding the sufficient amount of the additive results in the powder having the morphology selected from the group consisting of irregular, equiaxed, plate-like, and combinations thereof and the particle size distribution is selected from the group consisting of fine, intermediate, coarse, and combinations thereof.

In some embodiments, the morphology is irregular and the particle size distribution is fine. In some embodiments, the morphology is equiaxed and the particle size distribution is fine. In some embodiments, the morphology is plate-like and the particle size distribution is fine. In some embodiments, the morphology is irregular and the particle size distribution is intermediate. In some embodiments, the morphology is equiaxed and the particle size distribution is intermediate. In some embodiments, the morphology is plate-like and the particle size distribution is intermediate. In some embodiments, the morphology is irregular and the particle size distribution is coarse. In some embodiments, the morphology is equiaxed and the particle size distribution is coarse. In some embodiments, the morphology is plate-like and the particle size distribution is coarse.

In some embodiments, the powder has more than one morphology. In some embodiments, the morphology is irregular and plate-like and the particle size distribution is fine. In some embodiments, the morphology is irregular and equiaxed and the particle size distribution is fine. In some embodiments, the morphology is plate-like and equiaxed and the particle size distribution is fine.

In some embodiments, the morphology is irregular and plate-like and the particle size distribution is intermediate. In some embodiments, the morphology is irregular and equiaxed and the particle size distribution is intermediate. In some embodiments, the morphology is plate-like and equiaxed and the particle size distribution is intermediate.

In some embodiments, the morphology is irregular and plate-like and the particle size distribution is coarse. In some embodiments, the morphology is irregular and equiaxed and the particle size distribution is coarse. In some embodiments, the morphology is plate-like and equiaxed and the particle size distribution is coarse.

When more than one morphology and particle size distribution are identified, each morphology may be associated with each particle size distribution. For example, a morphology that is irregular and plate-like with a particle size distribution that is fine and intermediate means the irregular grains have a particle size distribution of fine or intermediate and the plate-like grains have a particle size of fine or intermediate.

In some embodiments, the morphology is irregular and plate-like and the particle size distribution is fine and intermediate. In some embodiments, the morphology is irregular and plate-like and the particle size distribution is fine and coarse. In some embodiments, the morphology is irregular and plate-like and the particle size distribution is intermediate and coarse.

In some embodiments, the morphology is irregular and equiaxed and the particle size distribution is fine and intermediate. In some embodiments, the morphology is irregular and equiaxed and the particle size distribution is fine and coarse. In some embodiments, the morphology is irregular and equiaxed and the particle size distribution is intermediate and coarse.

In some embodiments, the morphology is plate-like and equiaxed and the particle size distribution is fine and intermediate. In some embodiments, the morphology is plate-like and equiaxed and the particle size distribution is fine and coarse. In some embodiments, the morphology is plate-like and equiaxed and the particle size distribution is intermediate and coarse.

In some embodiments, the morphology is plate-like, equiaxed, and irregular and the particle size distribution is fine. In some embodiments, the morphology is plate-like, equiaxed, and irregular and the particle size distribution is intermediate. In some embodiments, the morphology is plate-like, equiaxed, and irregular and the particle size distribution is coarse. In some embodiments, the morphology is plate-like, equiaxed, and irregular and the particle size distribution is fine and intermediate. In some embodiments, the morphology is plate-like, equiaxed, and irregular and the particle size distribution is fine and coarse. In some embodiments, the morphology is plate-like, equiaxed, and irregular and the particle size distribution is intermediate and coarse. In some embodiments, the morphology is plate-like, equiaxed, and irregular and the particle size distribution is fine, intermediate and coarse.

In some embodiments, the morphology is irregular and plate-like and the particle size distribution is intermediate and fine. In some embodiments, the morphology is irregular and plate-like and the particle size distribution is coarse and fine.

In some embodiments, the sufficient amount of the additive is less than 0.75 wt. % based on a total weight of the powder. In some embodiments, the wt. % of the sufficient amount of the additive is calculated as the total weight of the metal in the additive divided by the total weight of the powder. In some embodiments, the sufficient amount of the additive is 0.001 to 0.75 wt. %. In some embodiments, the sufficient amount of the additive is 0.005 to 0.75 wt. %. In some embodiments, the sufficient amount of the additive is 0.01 to 0.75 wt. %. In some embodiments, the sufficient amount of the additive is 0.03 to 0.75 wt. %. In some embodiments, the sufficient amount of the additive is 0.05 to 0.75 wt. %. In some embodiments, the sufficient amount of the additive is 0.06 to 0.75 wt. %. In some embodiments, the sufficient amount of the additive is 0.0625 to 0.75 wt. %. In some embodiments, the sufficient amount of the additive is 0.07 to 0.75 wt. %. In some embodiments, the sufficient amount of the additive is 0.085 to 0.75 wt. %. In some embodiments, the sufficient amount of the additive is 0.1 to 0.75 wt. %. In some embodiments, the sufficient amount of the additive is 0.15 to 0.75 wt. %. In some embodiments, the sufficient amount of the additive is 0.2 to 0.75 wt. %. In some embodiments, the sufficient amount of the additive is 0.25 to 0.75 wt. %. In some embodiments, the sufficient amount of the additive is 0.3 to 0.75 wt. %. In some embodiments, the sufficient amount of the additive is 0.35 to 0.75 wt. %. In some embodiments, the sufficient amount of the additive is 0.4 to 0.75 wt. %. In some embodiments, the sufficient amount of the additive is 0.45 to 0.75 wt. %. In some embodiments, the sufficient amount of the additive is 0.5 to 0.75 wt. %. In some embodiments, the sufficient amount of the additive is 0.55 to 0.75 wt. %. In some embodiments, the sufficient amount of the additive is 0.6 to 0.75 wt. %. In some embodiments, the sufficient amount of the additive is 0.65 to 0.75 wt. %.

In some embodiments, the sufficient amount of the additive is 0.001 to 0.65 wt. %. In some embodiments, the sufficient amount of the additive is 0.001 to 0.6 wt. %. In some embodiments, the sufficient amount of the additive is 0.001 to 0.55 wt. %. In some embodiments, the sufficient amount of the additive is 0.001 to 0.5 wt. %. In some embodiments, the sufficient amount of the additive is 0.001 to 0.45 wt. %. In some embodiments, the sufficient amount of the additive is 0.001 to 0.4 wt. %. In some embodiments, the sufficient amount of the additive is 0.001 to 0.35 wt. %. In some embodiments, the sufficient amount of the additive is 0.001 to 0.3 wt. %. In some embodiments, the sufficient amount of the additive is 0.001 to 0.25 wt. %. In some embodiments, the sufficient amount of the additive is 0.001 to 0.2 wt. %. In some embodiments, the sufficient amount of the additive is 0.001 to 0.15 wt. %. In some embodiments, the sufficient amount of the additive is 0.001 to 0.1 wt. %. In some embodiments, the sufficient amount of the additive is 0.001 to 0.085 wt. %. In some embodiments, the sufficient amount of the additive is 0.001 to 0.07 wt. %. In some embodiments, the sufficient amount of the additive is 0.001 to 0.0625 wt. %. In some embodiments, the sufficient amount of the additive is 0.001 to 0.06 wt. %. In some embodiments, the sufficient amount of the additive is 0.001 to 0.05 wt. %. In some embodiments, the sufficient amount of the additive is 0.001 to 0.03 wt. %. In some embodiments, the sufficient amount of the additive is 0.001 to 0.01 wt. %. In some embodiments, the sufficient amount of the additive is 0.001 to 0.005 wt. %.

In some embodiments, the sufficient amount of the additive is 0.001 wt. %. In some embodiments, the sufficient amount of the additive is 0.005 wt. %. In some embodiments, the sufficient amount of the additive is 0.01 wt. %. In some embodiments, the sufficient amount of the additive is 0.03 wt. %. In some embodiments, the sufficient amount of the additive is 0.05 wt. %. In some embodiments, the sufficient amount of the additive is 0.06 wt. %. In some embodiments, the sufficient amount of the additive is 0.0625 wt. %. In some embodiments, the sufficient amount of the additive is 0.07 wt. %. In some embodiments, the sufficient amount of the additive is 0.085 wt. %. In some embodiments, the sufficient amount of the additive is 0.1 wt. %. In some embodiments, the sufficient amount of the additive is 0.1125 wt. %. In some embodiments, the sufficient amount of the additive is 0.15 wt. %. In some embodiments, the sufficient amount of the additive is 0.2 wt. %. In some embodiments, the sufficient amount of the additive is 0.25 wt. %. In some embodiments, the sufficient amount of the additive is 0.2625 wt. %. In some embodiments, the sufficient amount of the additive is 0.3 wt. %. In some embodiments, the sufficient amount of the additive is 0.35 wt. %. In some embodiments, the sufficient amount of the additive is 0.4 wt. %. In some embodiments, the sufficient amount of the additive is 0.45 wt. %. In some embodiments, the sufficient amount of the additive is 0.5 wt. %. In some embodiments, the sufficient amount of the additive is 0.5125 wt. %. In some embodiments, the sufficient amount of the additive is 0.55 wt. %. In some embodiments, the sufficient amount of the additive is 0.6 wt. %. In some embodiments, the sufficient amount of the additive is 0.65 wt. %. In some embodiments, the sufficient amount of the additive is 0.7 wt. %. In some embodiments, the sufficient amount of the additive is 0.75 wt. %.

In some embodiments, the method includes mixing reagents to form a precursor mixture, wherein the reagents comprise a first amount of a reducing agent; a second amount of a reactant wherein the reactant is a boron source, such as boron oxide, boric acid, or boron carbide and a metal source such as titanium dioxide, hafnium dioxide, zirconium dioxide, and a sufficient amount of an additive (e.g. type and amount of additive to tailor the ceramic powder product to a particular morphology). In some embodiments, the additive includes at least one of an oxide, a salt, a pure metal or an alloy of elements ranging from atomic numbers 21 through 30, 39 through 51, and 57 through 77 and combinations thereof. In some embodiments, the additive may include one or more of the elements as detailed above. In some embodiments, the sufficient amount of the additive is as detailed above for the titanium diboride powder.

In some embodiments, the method further includes reacting the precursor mixture to form a powder having a morphology and a particle size distribution. In some embodiments, the sufficient amount of the additive results in the powder having the morphology selected from the group consisting of irregular, equiaxed, plate-like, and combinations thereof and the particle size distribution selected from the group consisting of fine, intermediate, coarse, and combinations thereof. In some embodiments, the morphology and particle size distribution of the powder is as detailed above for the titanium diboride powder. In some embodiments, the reducing agent includes, but is not limited to, a carbon source in the form of a carbonaceous gas, including but not limited to, methane, ethane, propane or the like.

In some embodiments, the method includes mixing reagents to form a precursor mixture, wherein the reagents comprise a first amount of a carbon source; a second amount of a titanium source, a third amount of a boron source and a sufficient amount of an additive (e.g. type and/or amount in order to tailor the ceramic powder product to a particular morphology). In some embodiments, the additive includes at least one of an oxide, salt, pure metal or alloy of elements ranging from atomic numbers 21 through 30, 39 through 51, and 57 through 77 and combinations thereof. In some embodiments, the additive may include one or more of the elements as detailed above. In some embodiments, the sufficient amount of the additive is as detailed above for the titanium diboride powder.

In some embodiments, lower weight percentages of additives produce fine irregular shaped grains with smaller concentration of plate-like and equiaxed grains. In some embodiments, increasing process gas flow produces finer morphology types. In other embodiments, sulfur generally produces either equiaxed or plate like grains, although particle size may increase with additive concentration and with decreased process gas flows.

In some embodiments, the mixing (e.g. the precursors to form a precursor mixture) is conducted in any conventional mixer including, but not limited to, a ribbon blender, a V-blender, a cone screw blender, a screw blender, a double cone blender, a double planetary mixer, a high viscosity mixer, a counter-rotating mixer, a double & triple shaft mixer, a vacuum mixer, a high shear rotor stator, dispersion mixers, a paddle mixer, a jet mixer, drum blenders, and/or planetary mixer.

In some embodiments, the process gas is selected from the group consisting of any noble gas, hydrogen, and combinations thereof. In some embodiments, hydrogen is added to the reactor when low partial pressures of oxygen are required. In some embodiments, the process gas is argon. In some embodiments, the flow rate of the process gas is sufficient so as to result in removal of reaction byproducts. In some embodiments, the reaction byproducts include carbon monoxide, carbon dioxide, or vapors from high vapor pressure solids in the precursor mixture or powders. In some embodiments, the reaction byproducts include undesirable intermediates that detract from the main reaction.

In some embodiments, the flow rate of the process gas is sufficient to remove or reduce the concentration of the reaction byproducts in the reactor and/or sufficient to manage atmospheric chemistry in the reactor. In some embodiments, the process gas flow rate is based, at least in part, on the precursor mixture volume and configuration, the desired powder morphology, the temperature profile within the reactor and/or precursor mixture and/or other process conditions related to the powder production.

In some embodiments, the method includes exposing the precursor mixture to a sufficient temperature for a sufficient time to form a $TiB_2$ powder product via carbothermic reaction of the reagents in the precursor mixture. In some embodiments, the sufficient temperature is dependent on type of reagents and powder. In some embodiments, the sufficient temperature is 950 degrees Celsius to 1800 degrees Celsius. In some embodiments, the sufficient temperature is 1000 degrees Celsius to 1400 degrees Celsius. In some embodiments, the sufficient temperature is 1100 degrees Celsius to 1300 degrees Celsius.

In some embodiments, the sufficient time is dependent on type of reagents and powder and the sufficient temperature. In some embodiments, the sufficient time is 0.5 hour to 12 hours. In some embodiments, the sufficient time is 0.5 hour to 11 hours. In some embodiments, the sufficient time is 0.5 hour to 10 hours. In some embodiments, the sufficient time is 0.5 hour to 9 hours. In some embodiments, the sufficient time is 0.5 hour to 8 hours. In some embodiments, the sufficient time is 0.5 hour to 7 hours. In some embodiments, the sufficient time is 0.5 hour to 6 hours. In some embodiments, the sufficient time is 0.5 hour to 5 hours. In some embodiments, the sufficient time is 0.5 hour to 4 hours. In some embodiments, the sufficient time is 0.5 hour to 3 hours. In some embodiments, the sufficient time is 0.5 hour to 2 hours. In some embodiments, the sufficient time is 0.5 hour to 1 hours.

In some embodiments, the sufficient time is 1 hour to 12 hours. In some embodiments, the sufficient time is 2 hours to 12 hours. In some embodiments, the sufficient time is 3 hours to 12 hours. In some embodiments, the sufficient time is 4 hours to 12 hours. In some embodiments, the sufficient time is 5 hours to 12 hours. In some embodiments, the sufficient time is 6 hours to 12 hours. In some embodiments, the sufficient time is 7 hours to 12 hours. In some embodiments, the sufficient time is 8 hours to 12 hours. In some embodiments, the sufficient time is 9 hours to 12 hours. In some embodiments, the sufficient time is 10 hours to 12 hours. In some embodiments, the sufficient time is 11 hours to 12 hours.

In some embodiments, the sufficient time is 1 hour to 8 hours. In some embodiments, the sufficient time is 1 hour to 6 hours. In some embodiments, the sufficient time is 1 hour to 4 hours. In some embodiments, the sufficient time is 1 hour to 2 hours. In some embodiments, the sufficient time is 2 hour to 11 hours. In some embodiments, the sufficient time is 3 hour to 10 hours. In some embodiments, the sufficient time is 4 hour to 9 hours. In some embodiments, the sufficient time is 5 hour to 8 hours. In some embodiments, the sufficient time is 6 hour to 7 hours.

In some embodiments, the sufficient temperature and sufficient time are combination of the temperate and times detailed above.

In some embodiments, the heating of the precursor mixture in the reactor may be achieved using any suitable heating device. In some embodiments, the heating of the precursor mixture in the reactor is achieved using a furnace. In some embodiments, the heating device is positioned external from the reactor. In some embodiments, the heating device is positioned internal to the reactor.

In some embodiments, the method results in a ceramic powder having a morphology selected from the group consisting of irregular, equiaxed, plate-like, and combinations thereof and a particle size distribution selected from the group consisting of fine, intermediate, coarse, and combinations thereof. In some embodiments, the method results in a ceramic powder having a morphology and particle size distribution described herein.

In some embodiments, the present invention is a method comprising: mixing reagents to form a precursor mixture, wherein the reagents comprise: titanium dioxide; carbon source; boron source (e.g. boric acid, boron oxide); and a sufficient amount of an additive; wherein the additive includes at least one of an oxide, salt, pure metal or alloy of elements ranging from atomic numbers 21 through 30, 39 through 51, and 57 through 77 and combinations thereof; carbothermically reacting the precursor mixture to form a titanium diboride powder having a morphology and a PSD; wherein the sufficient amount of the additive results in the titanium diboride powder having the morphology selected from the group consisting of irregular, equiaxed, plate-like, and combinations thereof and the PSD selected from the group consisting of fine, intermediate, coarse, and combinations thereof; and wherein the sufficient amount of the additive is 0.001 wt. % to 0.75 wt. % based on a total weight of the titanium diboride powder.

In some embodiments, the present invention is a method comprising: mixing reagents to form a precursor mixture, wherein the reagents comprise: titanium dioxide; reducing agent; boric acid; and a sufficient amount of an additive; wherein the additive includes at least one of an oxide, salt, pure metal or alloy of elements ranging from atomic numbers 21 through 30, 39 through 51, and 57 through 77 and combinations thereof; reacting the precursor mixture to form a titanium diboride powder having a morphology and a PSD; wherein the sufficient amount of the additive results in the titanium diboride powder having the morphology selected from the group consisting of irregular, equiaxed, plate-like, and combinations thereof and the PSD selected from the group consisting of fine, intermediate, coarse, and combinations thereof; wherein the sufficient amount of the additive is 0.001 wt. % to 0.75 wt. % based on a total weight of the titanium diboride powder.

In some embodiments, the ceramic powders detailed herein may be used for multiple applications. In some embodiments, the ceramic powders are specifically tailored to be processed via ceramics processing techniques in order to form ceramic products (wherein the ceramic products are tailored for their application, based on the morphology of the ceramic powder product). FIG. 18 depicts a schematic of an embodiment of a method in accordance with the instant disclosure, including: providing a ceramic powder product having a specific morphology, for the utility of creating a ceramic part from the ceramic powder in accordance with ceramic production pathways (e.g., hot pressing, pressureless sintering, and/or hot isostatic pressing). In some embodiments, the as-reacted ceramic powder is still solid and/or semi-solid shape based on the configuration of the precursor mixture, such that a deagglomeration step is completed on the ceramic powder product prior to downstream processing. In some embodiments, forming includes forming a green form (e.g. which is then further processed to form a final ceramic product).

in backscatter electron mode. Based on each SEM image, the morphology and particle size distribution of the powder was determined as shown in Table 2. Select SEM images of the examples are shown in FIGS. 5 to 16.

TABLE 2

| Known Impurity | Intentional Additive Type | Intentional Additive Level | Example | Crucible Argon Flow | Equiaxed Grains | Plate-Like Grains | Irregular Grains |
|---|---|---|---|---|---|---|---|
| 0.2 wt % Fe | None | — | TiB2 Type 1 | Yes | Fine | Intermediate | |
| | | | TiB2 Type 2 | No | Fine | | |
| High Purity | None | — | TiB2 Type 3 | Yes | | Coarse | |
| | | | TiB2 Type 4 | No | Intermediate | Coarse | |
| High Purity | Co | 0.25-0.5 wt % | TiB2 Type 5 | Yes | | Intermediate | Fine |
| | | | TiB2 Type 6 | No | | Coarse | Fine |
| High Purity | Co | 0.1125 wt % | TiB2 Type 7 | Yes | | | Fine |
| | | | TiB2 Type 8 | No | | Intermediate | Fine |
| 0.2% Fe | Co | 0.0625-0.5 wt % | TiB2 Type 9 | Yes | | | Fine |
| High Purity | Fe | 0.1125 wt % | TiB2 Type 10 | Yes | | Coarse | Fine |
| | | | TiB2 Type 11 | No | | Intermediate | Fine |
| 0.2 wt % Fe | Fe | 0.0625-0.5 wt % | TiB2 Type 12 | Yes | | | Fine |
| High Purity | Ni | 0.1125 wt % | TiB2 Type 13 | Yes | | Intermediate | |
| | | | TiB2 Type 14 | No | | Intermediate | |
| 0.2 wt % Fe | Ni | 0.0625-0.5 wt % | TiB2 Type 15 | Yes | | Intermediate | Fine |
| High Purity | Fe—Ni—Co—W | 0.2625 wt % (0.1125% Fe—Ni—Co, .15% W) | TiB2 Type 16 | Yes | | | Fine |
| | | | TiB2 Type 17 | No | | Intermediate | Fine |
| High Purity | Fe—Ni—Co | 0.1125 wt % | TiB2 Type 18 | Yes | | Intermediate | Fine |
| | | | TiB2 Type 19 | No | | Intermediate | Fine |
| 0.2 wt % Fe | Cr | 0.0625-0.5 wt % | TiB2 Type 20 | Yes | Fine | Intermediate | |
| High Purity | S | 10-100 ppm | TiB2 Type 21 | Yes | Intermediate | Intermediate | |
| | | | TiB2 Type 22 | No | Intermediate | Intermediate | |
| High Purity | S | 4 wt. % | TiB2 Type 23 | Yes | Fine | | |
| | | | TiB2 Type 24 | No | Coarse | | |
| High Purity | S/Co | 10-100 ppm/ 0.25 wt % | TiB2 Type 25 | Yes | | | Fine |
| | | | TiB2 Type 26 | No | | Intermediate | Fine |
| High Purity | S/Co | 4 wt. %/0.25 wt % | TiB2 Type 27 | Yes | | Intermediate | Fine |
| | | | TiB2 Type 28 | No | | Coarse | |
| High Purity | S/Fe | 0.2 wt. % S/0.2 wt % | TiB2 Type 29 | Yes | | Coarse | |

Non-Limiting Examples

The following examples are intended to illustrate the invention and should not be construed as limiting the invention in any way.

Non-limiting examples of the ceramic compounds produced using an embodiment of the method of the present invention are shown in Table 2, where the precursor mixture was reacted in a tube furnace (e.g. a bench scale reactor having about a 25 g capacity). The "TiB$_2$ Type 1", "TiB$_2$ Type 2", examples are comparative examples. The examples in Table 2 were conducted as follows:

Mixtures containing stoichiometric and near-stoichiometric molar ratios of titanium dioxide, boric acid and carbon; and the specified wt. % of additive shown in Table 2 were fed to a graphite reactor and exposed to a temperature of 1500 degrees Celsius. In some examples, the titanium dioxide, boric acid, carbon, and additive, if present, were also exposed to argon gas in the graphite reactor as shown in Table 2. SEM images of the resultant powder were taken at a 2500× magnification using an Aspex Instruments PSEM II FIG. 17 provides a schematic outline of various production pathways to make TiB2 ceramic powder having different morphologies, in accordance with various embodiments of the instant disclosure, based on the data obtained in the bench top furnace.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

We claim:
1. A method, comprising:
(a) preparing a precursor mixture, wherein the preparing comprises adding at least one additive to a plurality of reagents;
  (i) wherein the plurality of reagents comprise titanium dioxide, a boron source, and a carbon source;
  (ii) wherein the at least one additive is intentionally added and selected from the group consisting of:
    (A) a salt of elements of Fe, Ni, Co, W, and Cr;
    (B) a pure metal of elements of Fe, Ni, Co, W, and Cr;
    (C) an alloy of elements of Fe, Ni, Co, W, and Cr; and
    (D) combinations of (A)-(C); and
(b) carbothermically reacting the precursor mixture to form a titanium diboride particles, the titanium diboride particles defining a titanium diboride powder;
  (i) wherein, at least partially due to the at least one additive, the titanium diboride particles realize a mor- phology selected from the group consisting of irregular, equiaxed, plate-like, and combinations thereof; and (ii) wherein, at least partially due to the at least one additive, the titanium diboride powder produced by the titanium diboride particles realizes a fine particle size distribution, wherein the D50 of the titanium diboride particles is less than 3 micrometers;

wherein the preparing step (a) comprises adding from 0.001 to 0.75 wt. % of the at least one additive to the plurality of reagents based on a total weight of the titanium diboride powder.

2. The method of claim 1, comprising:

removing an undesired byproduct of the carbothermic reaction, wherein the removing comprises exposing the precursor mixture to a process gas flow during the carbothermic reacting step.

3. The method of claim 2, wherein exposing the precursor mixture comprises directing the process gas flow through the precursor mixture during the carbothermic reacting step.

4. The method of claim 2, wherein the process gas is selected from the group consisting of: a noble gas, hydrogen, and combinations thereof.

5. The method of claim 1, wherein the precursor mixture comprises from 20 wt. % to 50 wt. % of the titanium dioxide.

6. The method of claim 1, wherein the precursor mixture comprises from 10 wt. % to 35 wt. % of the carbon source.

7. The method of claim 6, wherein the carbon source comprises graphite.

8. The method of claim 1, wherein the precursor mixture comprises from 30 wt. % to 70 wt. % of the boron source.

9. The method of claim 1, wherein the preparing step (a) comprises adding 0.0625-0.5 wt. % of the least one additive to the plurality of reagents based on the total weight of the titanium diboride powder.

10. The method of claim 1, wherein the preparing step (a) comprises adding from 0.001 to 0.45 wt. % of the at least one additive to the plurality of reagents based on the total weight of the titanium diboride powder.

11. The method of claim 1, wherein the intentionally-added, at least one additive is selected from the group consisting of: a pure metal of elements of Fe, Ni, Co, W, and Cr, and combinations of those pure metals.

12. The method of claim 1, wherein the intentionally-added, at least one additive is selected from the group consisting of: an alloy of elements of Fe, Ni, Co, W, and Cr, and combinations of those alloys.

13. The method of claim 1, wherein the titanium diboride particles realize a shape factors which has ratio of x, y, and z dimensions of the particles being x: y: z=10:1:1.

14. The method of claim 1, wherein the titanium diboride particles realize a morphology of irregular.

* * * * *